No. 690,593. Patented Jan. 7, 1902.
A. W. LIVINGSTON.
AUTOMATIC CAN HEADING MACHINE.
(Application filed Dec. 4, 1900.)
(No Model.) 4 Sheets—Sheet 3.
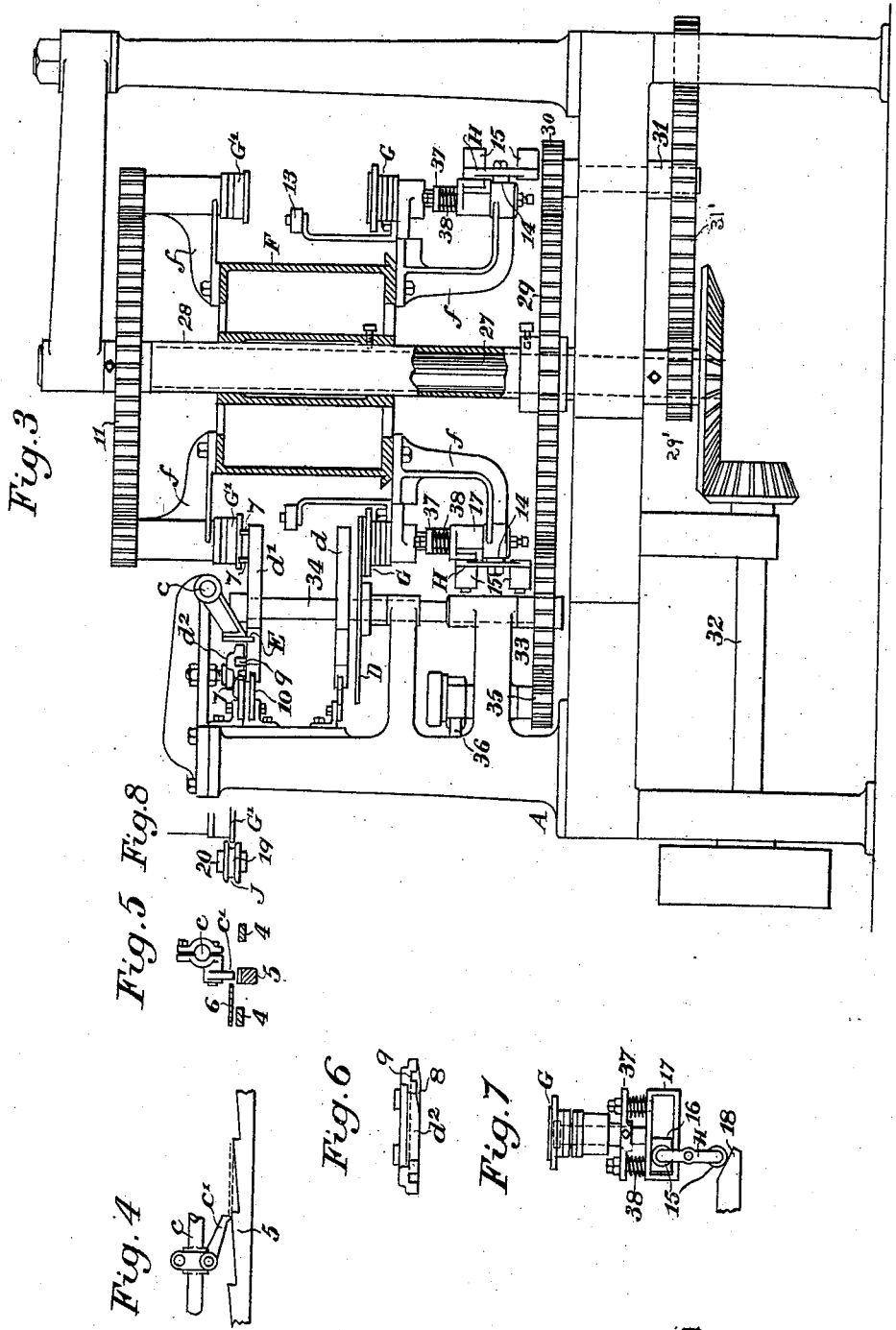

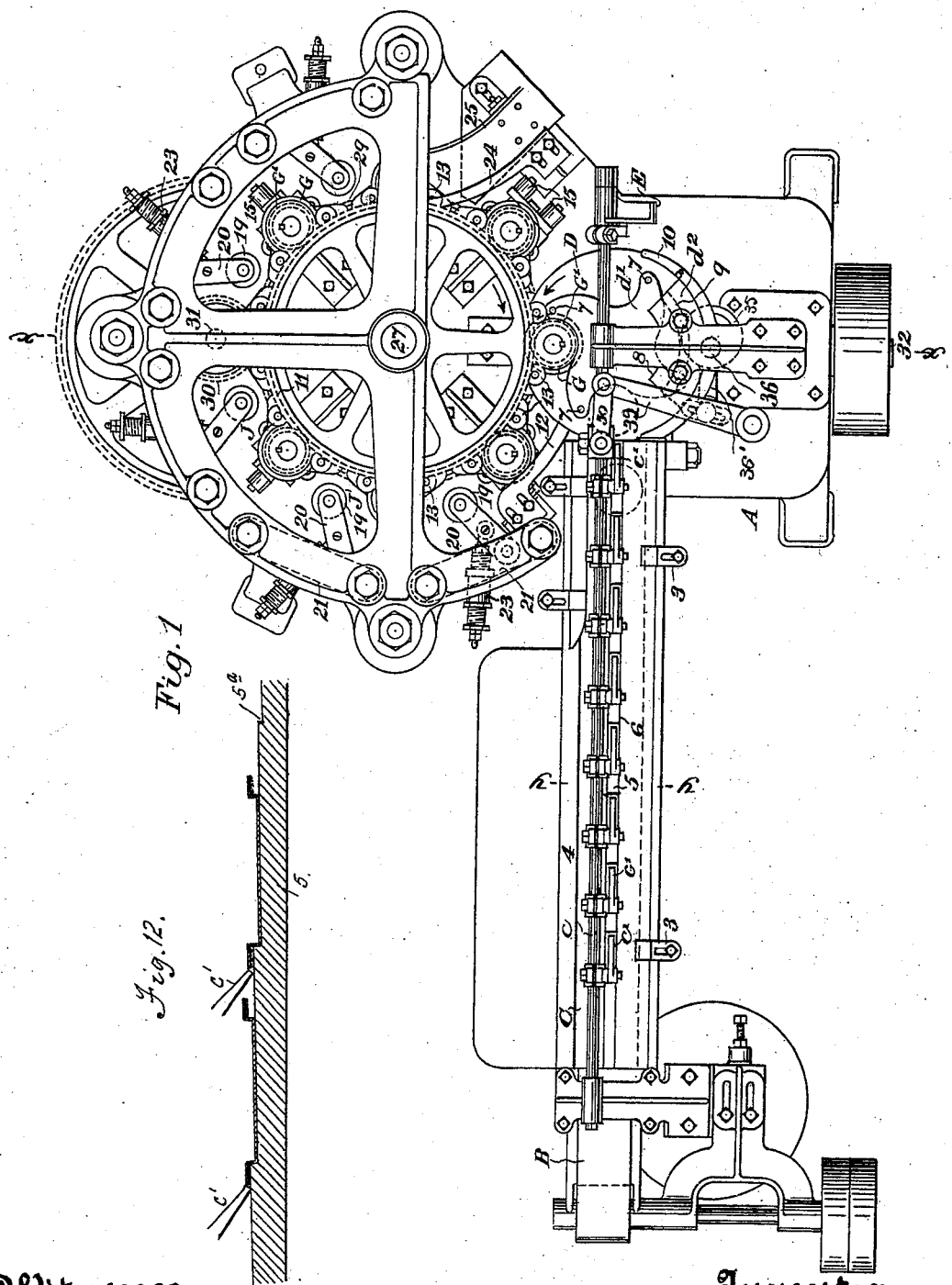

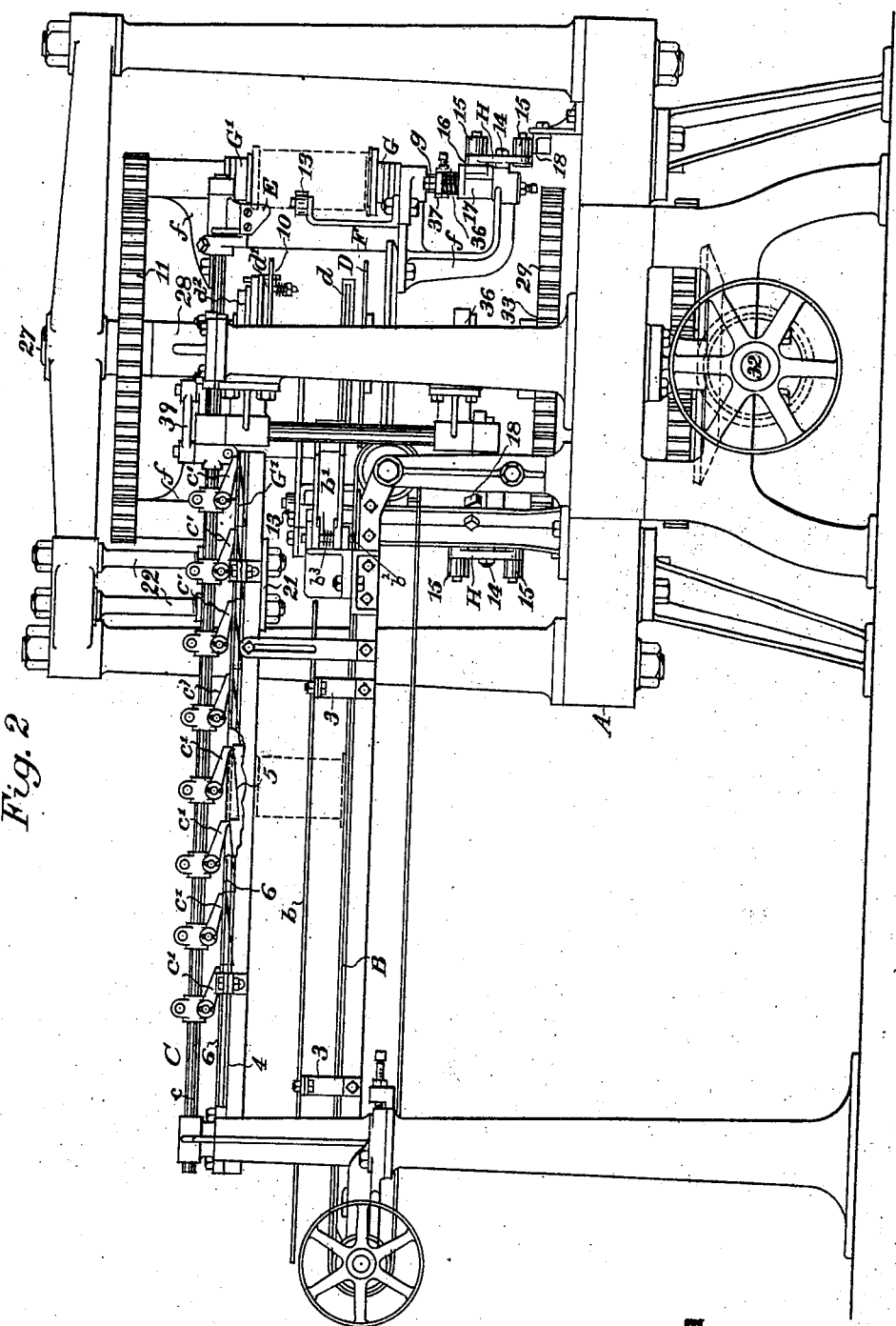

No. 690,593. Patented Jan. 7, 1902.
A. W. LIVINGSTON.
AUTOMATIC CAN HEADING MACHINE.
(Application filed Dec. 4, 1900.)
(No Model.)
4 Sheets—Sheet 4.
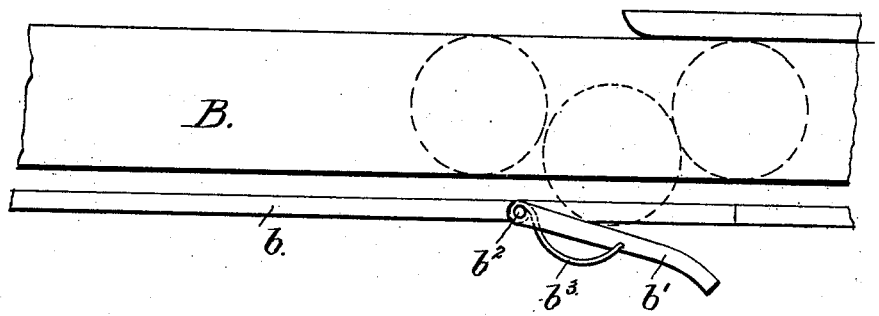
Fig. 9.
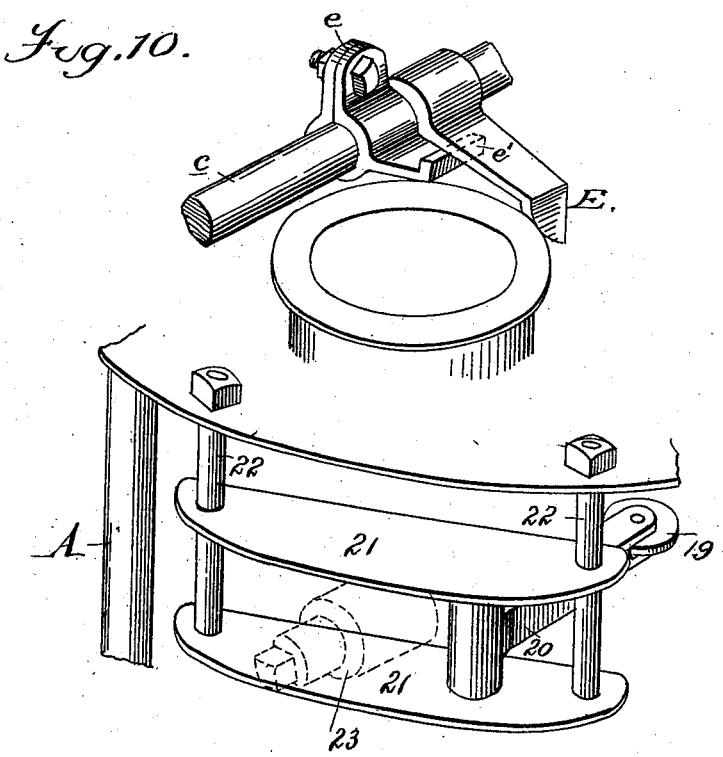
Fig. 10.
Fig. 11.
WITNESSES
Chapman N. Fowler
F. L. Mockabee
INVENTOR
Andrew W. Livingston,
by Dewey Strong & Co.
his Attorneys

UNITED STATES PATENT OFFICE.

ANDREW W. LIVINGSTON, OF ALAMEDA, CALIFORNIA.

AUTOMATIC CAN-HEADING MACHINE.

SPECIFICATION forming part of Letters Patent No. 690,593, dated January 7, 1902.

Application filed December 4, 1900. Serial No. 38,637. (No model.)

*To all whom it may concern:*

Be it known that I, ANDREW W. LIVINGSTON, a citizen of the United States, residing in Alameda, county of Alameda, and State of California, have invented an Improvement in Automatic Can-Heading Machines; and I hereby declare the following to be a full, clear, and exact description of the same.

My invention relates to improvements in machines for automatically securing metal ends upon can-bodies.

It consists of the parts and the constructions and combinations of parts hereinafter described and claimed.

Figure 1 is a plan of my invention. Fig. 2 is a front elevation of the same. Fig. 3 is an end elevation taken at $x\ x$ of Fig. 1, the drum and portion of the sleeve being in section. Fig. 4 is a view of a portion of the rack-bar. Fig. 5 is a transverse section taken on the line $y\ y$ of the conveyer-bed. Fig. 6 is an inner view of the segmental pressure-plate. Fig. 7 is a front view of one of the lower chucks. Fig. 8 is a view of a seamer. Fig. 9 is a detail showing the spring-gate $b'$. Fig. 10 is a detail of the pawl E and its adjuncts. Fig. 11 is a detail of the guide-plates 21. Fig. 12 is an enlarged sectional detail of a portion of the conveyer with two can-heads thereon.

The object of my invention is to provide a machine of greater capacity than is ordinarily possessed by the devices in use; also, to furnish a machine that is practically self-operating, for only thereby is it possible to turn out the cans in sufficient quantity. With this device I am able to seal and deliver three thousand five hundred cans an hour, and this number is even capable of greater increase; further, coupled with this ability of increased output to furnish cans whose joints are as near absolutely perfect as possible, for without the qualifications of a perfect joint a can is not only worthless to the user, but renders the maker liable for very considerable damages for loss arising from its use. These results are accomplished in the following manner.

Referring to the drawings, A represents a suitable framework supporting the various parts of the machine.

B is a horizontal endless conveyer, upon which the can-bodies are fed by any desired means. Upon either side of this conveyer are guides $b$, adjustable, as by means of a slotted base-plate 3, to varying diameters of cans. These can-bodies are cylindrical, having an exterior flange at either end.

The can "heads" or "ends" (as the terms are used indiscriminately) are represented as having flanges corresponding to and overlapping the flanges on the ends of the can-bodies. Preparatory to admission of the heads to the machine the under side of these flanges has been treated with a filling or packing well known in the art and which makes a hermetic joint when the flanges of the head and body have finally been properly "seamed."

Superposed above the conveyer B, with just enough room therebetween for the passage of the can-bodies, is the can-head conveyer C. This conveyer is a reciprocating rod $c$, upon which are suspended the fingers $c'$. These fingers are separated from each other a distance equal to the diameter of the can-heads. The bed of this conveyer consists of parallel metal strips 4, between which is a ratcheted plate 5, whose teeth project slightly above the plane of the strips 4 and are for the purpose of engaging the edge of the head as it is moved forward by the finger $c'$ and preventing its being pulled back again by the return of the fingers. A guide 6 holds these heads in alinement and prevents vertical displacement. The heads are delivered to the conveyer by any suitable means. As the filling upon the flange of the head is easily rubbed off, it is understood why such a conveying device is necessary. In Fig. 12 I illustrate an enlarged sectional view of a portion of the conveyer with two can-heads thereon. In the actual operation of the machine the depth of the flange of the can-head is a little greater than the depth of the notches $5^a$ of the ratcheted plate, the notches simply acting as stops to hold the head while the fingers $c'$ are drawn back over the head to engage that head in the forward movement again of the fingers. This form of conveyer prevents one can-head from overlapping another, and the shape of the head keeps the pasted parts out of contact with the said conveyer, and therefore prevents the filling being easily rubbed off. Furthermore, as these heads and bodies are delivered into the machine at the rate of, say, one a second the timing of their delivery must be absolute. Hence these two conveyers are so geared in relation to each other as to deliver the body and head upon the revolving centering-table D simultaneously, so that the head may fall in place upon the body. This centering is effected by means of the guides or spiders $d$ and $d'$. However, should if by any reason the can-bodies come upon the conveyer B so rapidly as to clog or jam relief is immediately afforded by means of a spring-actuated gate $b'$ in one of the guide-walls $b$, which allows the accumulating cans to be discharged and the machine to readjust itself. This gate is hinged at $b^2$, and a spring $b^3$ tends to hold it closed. The upper one of the spiders, or $d'$, is provided with guide-pins 7, which project above the top of the can-body sufficiently to interrupt and hold the can-head as it leaves the conveyer C and center it over the can-body. The head, now resting upon the body, is next to be forced down tightly thereon, and this is done by means of the fixed segmental pressure-plate $d^2$, under which the can is now carried by the revolution of the table D. This plate has its front edge, with which the can comes in contact, inclined, as at 8, and a curved groove 9 allows the projecting pins 7 to pass through. A segmental guide 10 holds the can from any centrifugal tendency to leave the table. Passing from beneath this pressure-plate the flanges of the head and body are now closely united.

It occasionally happens in the rapid running of the machine that a can-body fails to receive a head. That this body may not be spoiled by coming in contact with the seamers later, I provide an automatic ejector consisting of the pawl E, turnable upon the reciprocating rod $c$ and supported in a horizontal position by means of a projection $e'$ on the clamp $e$, as shown in Fig. 10. If the can has no head upon it, the pawl drops into the can on the back stroke of the rod and on the forward stroke carries the can clear of the spider. When the cans are headed, the pawl simply rides over the head of the can and allows the latter to pass on to the next stage of the process, which is that of crimping or seaming. For this work I provide a drum F or suitable revolving support. Upon this drum are brackets $f$, carrying the chucks G and G'. A large gear-wheel 11 upon the shaft 27 causes the upper chucks G' to revolve with great rapidity. The drum is secured to the sleeve 28 upon the shaft 27. Upon this sleeve is a gear-wheel 29, which meshes with a gear 30 upon a shaft 31. Another gear, 31', engages a gear 29' upon the shaft 27, which latter is connected with the main power-shaft 32. Thus the drum is revolved about the revolving shaft 27. The gear-wheel 29 upon the sleeve also drives the revolving table D through the gear 33 upon the shaft 34 of the table. This table-gear 33 in turn meshes with a cog 35, Fig. 1, which has an eccentric crank 36, Fig. 1. A link 36' connects this crank with the oscillating lever 39, and the end of this lever is connected by a second link 50 with the conveyer-rod $c$, whereby the latter is given its reciprocating movement. To this crank is pivoted a link connecting with the reciprocating lever 39, which actuates the conveyer-rod $c$. The adjustment of these gears, &c., so as to regulate the timing of the different parts of the machine and have each perform its specific function properly is such as is readily determined by the mechanic.

The cans are delivered from the table D upon the chucks G by means of the guide 12. Here they are centered and supported by means of the roller-guides 13. The spindles $g$ of the chucks G are slidable in their journals in such manner that the lower chucks may be made to approach the upper chucks and grip the cans between them. This is effected by means of a lever H, centrally fulcrumed upon the bracket, as at 14. On either end of this lever are rollers 15. The upper end is socketed in a block 16, which latter is slidable in a box 17, slidably mounted upon the chuck-spindle $g$. A collar 37 is fixed to the spindle above the box 17, and between the collar and box is interposed a spring 38, which relieves the jar when the box is suddenly lifted and compensates for variations in the height of cans and prevents buckling of the bodies.

Fixed to the frame is an annular bar or cam-plate 18. As the drum revolves with the can in place upon the chuck G the lower roller on the lever H slides upon this cam-plate, raises the lower chuck, and forces the can against the revolving upper chuck. The can is thus revolved and brought successively against the seamers or crimpers J. As shown, there are five of these seamers so adjusted that each performs only a part of the work of crimping the flanges or seaming the can. The first three perform what is termed "rolling the seam" and for the purpose have round grooves in their rollers 19. The depth and curve of these grooves may vary in the different rollers. The last two rollers have square grooves, which flatten the seam against the body and give the finish or "double seam" to the can, securely crimping the flanges of the head and body to form a hermetic joint. It is to be understood that the number or position of these seamers may be varied as deemed advisable. The rollers 19 are carried on swinging arms 20, which are supported between the guide-plates 21. These guides are carried upon the studs 22, attached to the frame. An automatic tension member 23 is connected to the arms, by which the seaming-rollers are held firmly against the can and adjustment made for the cans in the revolution of the drum. After passing the last seamer the lever H rolls from the cam-plate 18 and the lower chuck is dropped, releasing the can. A guide 24 directs the can upon the discharge 25, whence it may be taken upon runways or by elevators to any desired point. Thus the operation from the time the can-heads and can-bodies separately enter the machine till the discharge of the completed can is entirely self-regulating.

This machine is adaptable to the seaming of cans of any desired shape by simply changing the spiders and the upper chucks to conform to the shape of the can to be operated upon.

Having thus described my invention, what I claim as new, and desire to secure by Letters Patent, is—

1. An automatic can-heading machine comprising conveyers by which the heads and bodies are separately introduced into the machine, and the heads placed upon the bodies, said can-head conveyer having notches or stops on its surface adapted to engage the rear edge of the head as the latter is advanced, means for advancing the heads on their conveyer and means for seaming the heads and bodies.

2. In a can-heading machine, a can-head conveyer having a ratcheted bottom adapted to engage the rear edge of the heads, in combination with means for advancing the heads along the conveyer.

3. An automatic can-heading machine, including superposed conveyers one of said conveyers having a ratcheted bottom adapted to engage the rear edge of the head as the latter is advanced, means for advancing the heads on their conveyer, a revolving table upon which the heads and bodies are delivered, means for centering the heads upon the bodies, and means whereby the heads and bodies are seamed and the cans delivered from the machine, the operation throughout being entirely self-regulating.

4. In a can-heading machine, the combination of conveyers for the heads and bodies said head-conveyer including a ratcheted portion to engage the rear edge of the head, means for advancing the heads, a table upon which the heads and bodies are received, guides and supports which receive and center the heads upon the bodies, and means by which the bodies and heads are united and seamed.

5. In a can-heading machine, the combination of a can-body conveyer, a can-head conveyer having a ratcheted surface to engage the can-head, means for advancing the heads on their conveyer, a revolving table upon which the heads and bodies are delivered, and the heads centered upon the bodies, a pressure-plate by which the parts are united, and means for securing the seam of the heads and bodies.

6. In an automatic can-heading machine, an endless conveyer upon which the can-bodies are supported, a superposed conveyer carrying the can-heads, the latter conveyer having a ratcheted bottom adapted to engage the rear edge of the heads as the latter are advanced, a reciprocating means by which this advance is made, and means whereby the heads and bodies are united and seamed.

7. In an automatic can-heading machine, a conveyer supporting the can-bodies, a superposed reciprocating conveyer supporting the can-heads, means by which can-bodies may be automatically discharged from the conveyer in case the cans are fed thereon too rapidly, a revolving table upon which the bodies are received, guides or spiders upon this table and revolving therewith and whereby the bodies are held thereon and the can-heads are received and centered upon the bodies, and means by which the flanges of the heads and bodies are united in a tight joint.

8. In an automatic can-heading machine, a revolving table, means for delivering can-bodies thereon, guides or spiders against which the bodies are received and held in place, one of these spiders provided with projecting pins by which the entering can-heads are centered over and placed upon their respective bodies, means by which the head is pressed down upon the body, and means whereby cans unprovided with heads are ejected from the spiders.

9. In an automatic can-heading machine, a revolving table, guides or spiders thereupon and revolving therewith, means by which can-bodies are delivered into the spiders, a reciprocating carrier delivering the can-heads upon the bodies, pins upon the spiders by which the centering of the heads and bodies is effected, a pawl upon the reciprocating rod of the can-head carrier whereby cans unprovided with heads are ejected from the spiders.

10. In an automatic can-heading machine, a revolving table, conveyers by which can-heads and can-bodies are delivered simultaneously upon this table, spiders by which these bodies are held, projections upon certain of the spiders, whereby the heads are guided and centered upon the bodies, a fixed segmental plate under which the bodies and heads are passed, and the heads forced tightly upon the bodies, an annular groove in the bottom of the plate allowing the spiders to revolve freely therebeneath.

11. In an automatic can-heading machine, the combination with a revolving table upon which the can-heads and can-bodies are received, and the heads placed in position upon the bodies, of a revolving support upon which the cans are delivered from the said table, means for revolving these cans independently of the revolution of the said support, and seaming devices including rollers, swinging arms upon which the rollers are carried, and a tension member connected to the arms and by which the rollers are held against the can and adjustment made for the cans in the revolution of the table, said rollers each performing only a part of the operation of seaming.

12. In an automatic can-heading machine, a revolving support or drum, brackets upon the upper and lower portions of the drum and projecting horizontally beyond the circumference thereof, an upper and lower set of chucks, connections with the drum-shaft whereby the upper chucks are revolved, and means, including a centrally-fulcrumed lever having one end connected with the lower-chuck spindle, and a cam-surface in the path of the other end of said lever, whereby the lower chucks may be made to approach the upper chucks and hold securely cans interposed between the lower chucks and their respective upper chucks.

13. In an automatic can-heading machine, a revolving support or drum, an upper and lower set of chucks carried thereon outside of, and concentric with, the circumference of said drum, connections whereby the upper chucks are made to revolve independently of the revolution of the drum, each of the lower chucks provided with a lever, each centrally fulcrumed and having one end connected with the lower-chuck spindle by which a lower chuck may be lifted and made to hold a can firmly between it and its respective upper chuck, and means including a cam in the path of the other end of the lever for operating this lever.

14. In an automatic can-heading machine, a revolving support or drum, an upper and lower set of revoluble chucks carried thereon, each of the lower chucks connected with one end of a lever, which latter is centrally fulcrumed, and having its other end adapted to engage a cam whereby a lower chuck is lifted toward its respective upper chuck and a can firmly held between the two chucks, a box on the spindle of each lower chuck and to which the upper end of the lever is connected, and a cushion between the box and a fixed part adapted to relieve the jar when the box is suddenly lifted.

15. In an automatic can-heading machine, a revolving support or drum, brackets upon the drum carrying an upper and lower set of chucks, means by which the upper chucks are revolved, the spindles of each of the lower chucks made slidable in its journal, a collar upon each spindle, a box upon the spindle and below the collar, a spring interposed between the collar and the box, one end of a lever slidable in this box, the lever centrally fulcrumed and having a roller upon its lower end which is adapted to engage, during the revolution of the drum, a cam and raise the lower chuck and bind the can held thereon against a respective upper chuck, causing the chucks and can to revolve together.

16. The combination in an automatic can-heading machine with a revolving support or drum, of a means by which can-bodies with their can-heads in position may be delivered upon a lower set of chucks and beneath an upper set of chucks upon this drum, means by which the upper chucks are revolved independently of the revolution of the drum, a centrally-fulcrumed lever in connection with each of the lower chucks, one end of which attaches to the spindle of the chuck and the other is provided with a roller adapted to engage an annular cam-plate upon the frame by the revolution of the drum, whereby the lower chuck is raised and the can brought in contact with the upper chuck, securely held and rapidly revolved, seamers engaging and crimping the flanges of the can, means by which the lower chuck is again dropped and the can delivered from the machine.

17. A can-heading machine, consisting in combination, of a horizontal endless conveyer upon which the can-bodies, having exterior end flanges, are carried, guides upon this conveyer, an automatic discharge-gate at the inner end of the conveyer, a second conveyer superposed above the first, consisting of a reciprocating rod, fingers upon this rod adapted to engage the can-heads, a ratcheted bottom to this carrier by which the edges of the head are stopped and prevented from backward movement by the reciprocation of the rod and fingers, a guide by which the head is prevented from transverse or lateral displacement, a revolving table upon which the can-bodies are delivered, spiders thereon to hold and guide these bodies, the upper spider provided with pins which arrest the can-heads, center them above the can-bodies and allow them to drop in place upon the latter; a fixed segmental pressure-plate under which the bodies and heads in position, now known as cans, are passed by the revolution of the table and its spider, and the heads firmly pressed down upon the bodies so as to bring their extending flanges in close contact; a pawl upon the end of the reciprocating rod extending over the table by which bodies unprovided with heads are ejected from the spiders; guides by which the cans are led onto and centered upon lower chucks upon a revolving drum, said chucks turnable in journals upon their bracket-supports, each of these chucks provided with a corresponding upper chuck, which latter is revolved independently of the revolution of the drum; a means by which the lower chucks may be lifted and the cans held thereon forced against the upper chucks and revolved, adjustable seamers engaging the flanges of the bodies and heads, certain of these seamers adapted to roll the seam, and certain of them adapted to flatten and finish the seam, and means for releasing the cans from the chucks and delivering them from the machine.

In witness whereof I have hereunto set my hand.

ANDREW W. LIVINGSTON.

Witnesses:
JAMES L. KING,
HENRY C. DROGER.